US012509577B2

(12) United States Patent
Wang et al.

(10) Patent No.: US 12,509,577 B2
(45) Date of Patent: Dec. 30, 2025

(54) HETEROPHASIC PROPYLENE POLYMER COMPOSITION WITH IMPROVED PROPERTY PROFILE

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT)

(73) Assignee: BOREALIS AG, Vienna (AT)

( * ) Notice: Subject to any disclaimer, the term of this patent is extended or adjusted under 35 U.S.C. 154(b) by 955 days.

(21) Appl. No.: 17/760,941

(22) PCT Filed: Sep. 18, 2020

(86) PCT No.: PCT/EP2020/076125
§ 371 (c)(1),
(2) Date: Mar. 16, 2022

(87) PCT Pub. No.: WO2021/053154
PCT Pub. Date: Mar. 25, 2021

(65) Prior Publication Data
US 2022/0332931 A1    Oct. 20, 2022

(30) Foreign Application Priority Data

Sep. 20, 2019   (EP) .................................. 19198614

(51) Int. Cl.
C08L 23/14    (2006.01)
(52) U.S. Cl.
CPC ....... *C08L 23/142* (2013.01); *C08L 2205/025* (2013.01); *C08L 2205/03* (2013.01); *C08L 2207/02* (2013.01)
(58) Field of Classification Search
None
See application file for complete search history.

(56) References Cited

U.S. PATENT DOCUMENTS

| 10,875,993 | B2 * | 12/2020 | Gahleitner | ............ | C08F 210/06 |
| 2010/0021666 | A1 * | 1/2010 | De Palo | ................... | C08L 23/10 |
| | | | | | 525/240 |
| 2010/0152391 | A1 * | 6/2010 | Paridon | ................... | C08L 23/06 |
| | | | | | 525/240 |

FOREIGN PATENT DOCUMENTS

| CN | 105934476 | A | | 9/2016 | |
| EP | 0887379 | A | | 12/1998 | |
| EP | 0887380 | A | | 12/1998 | |
| EP | 0887381 | A | | 12/1998 | |
| EP | 0991684 | A | | 4/2000 | |
| EP | 1358266 | B1 | | 11/2003 | |
| EP | 2586823 | A1 * | 5/2013 | ............ | C08L 23/142 |
| EP | 3456776 | A1 | | 3/2019 | |
| EP | 3620487 | A1 | | 3/2020 | |
| WO | 92/12182 | A1 | | 7/1992 | |
| WO | 99/24478 | A1 | | 5/1999 | |
| WO | 99/24479 | A1 | | 5/1999 | |
| WO | 00/68315 | A1 | | 11/2000 | |
| WO | 2004/000899 | A1 | | 12/2003 | |
| WO | 2004/111095 | A1 | | 12/2004 | |
| WO | 2006/002778 | A1 | | 1/2006 | |
| WO | 2008/077773 | A1 | | 7/2008 | |
| WO | 2011/160953 | A1 | | 12/2011 | |
| WO | 2013/007650 | A1 | | 1/2013 | |
| WO | 2013/079457 | A1 | | 6/2013 | |
| WO | 2015/011135 | A1 | | 1/2015 | |
| WO | 2017/198639 | A1 | | 11/2017 | |
| WO | 2019/121597 | A1 | | 6/2019 | |

OTHER PUBLICATIONS

Busico, et al., "Alk-1-ene Polymerization in the Presence of a Monocyclopentadienyl Zirconium(IV) Acetamidinate Catalyst: Microstructural and Mechanistic Insights" Macromol. Rapid Commun. 2007, 28, 1128-1134.
Castignolles, et al., "Detection and quantification of branching in polyacrylates by size-exclusion chromatography (SEC) and melt-state 13C NMR spectroscopy" Polymer 5, 2009, 2373-2383.
Gurmeet Singh, et al., "Triad sequence determination of ethylene-propylene copolymers—application of quantitative 13C NMR" Polymer Testing 28 (2009) 475-479.
H.N. Cheng, "13C NMR Analysis of Ethylene-Propylene Rubbers", Macromolecules 1984, 17, 1950-1955.
John M. Griffin, "Low-load rotor-synchronised Hahn-echo pulse train (RS-HEPT) 1H decoupling in solid-state NMR: factors affecting MAS spin-echo dephasing times", Magnetic Reson. Chem. 2007; 45: S198-S208.
Katja Klimke, et al. "Optimisation and Application of Polyolefin Branch Quantification by Melt-State 13C NMR Spectroscopy" Macromol. Chem. Phys. 2006, 207, 382-395.
M. Pollard, et al. "Observation of Chain Branching in Polyethylene in the Solid State and Melt via 13C NMR Spectroscopy and Melt NMR Relaxation Time Measurements" Macromolecules 2004, 37, 813-825.
Matthew Parkinson, et al. "Effect of Branch Length on 13C NMR Relaxation Properties in Molten Poly[ethyleneco-(a-olefin)] Model Systems" Macromol. Chem Phys. 2007, 208, 2128-2133.
Wen-Jun Wang, et al., "Structural Analysis of Ethylene/Propylene Copolymers Synthesized with a Constrained Geometry Catalyst" Macromolecules 2000, 33, 1157-1162.
Xenia Filip, et al., "Heteronuclear decoupling under fast MAS by a rotor-synchronized Hahn-echo pulse train" Journal of Magentic Resonance 176, 2005, 239-243.

(Continued)

*Primary Examiner* — Michael J Feely
(74) *Attorney, Agent, or Firm* — Tarolli, Sundheim, Covell & Tummino LLP

(57) ABSTRACT

The present invention relates to a heterophasic polypropylene composition with an improved property profile, e.g. improved balance of toughness, softness and haze, comprising a heterophasic propylene copolymer and a copolymer of propylene and 1-hexene.

20 Claims, No Drawings

(56) References Cited

OTHER PUBLICATIONS

Zhe Zhou, et al., "A new decoupling method for accurate quantification of polyethylene copolymer composition and triad sequence distribution with 13C NMR" Journal of Magnetic Resonance 187 (2007) 225-233.
Resconi, Luigi, et al. "Selectivity in Propene Polymerization with Metallocene Catalysts" Chem Rev. 2000, 100, 1253-1345.
Kakugo, Masahori, et al., 13C NMR Determination of Monomer Sequence Distribution in Ethylene-Propylene Copolymers Prepared with d-TiC13—Al(C2H5)2Cl, (1982).
Chinese Office Action dated Apr. 26, 2023.

* cited by examiner

US 12,509,577 B2

HETEROPHASIC PROPYLENE POLYMER COMPOSITION WITH IMPROVED PROPERTY PROFILE

The present invention relates to a heterophasic polypropylene composition with an improved property profile, e.g. improved balance of toughness, softness and haze, comprising a heterophasic propylene copolymer and a copolymer of propylene and 1-hexene. The invention further relates to a process for preparing such a heterophasic polypropylene composition and its use for e.g. blown or cast films.

BACKGROUND OF THE INVENTION

There is an increasing trend in the food and medical packaging industry to use polyolefin materials such as polypropylene films. Packaging films made of random heterophasic propylene copolymers (RAHECOs) comprising a crystalline matrix and rubber phase dispersed within said matrix are widely used in the field of food and medical packaging. For such applications, tough packaging materials with good optical properties in combination with softness are required.

For medical applications, the polymer should impart sufficient stiffness as well as high impact strength to the final packaging material wherein softness rather than stiffness is a key requirement. Of course, also these medical products must be sterilizable.

It is a continuous request by the industry to have polymers at hand that show better stiffness and better impact behaviour combined with better flowability at the same time and fulfill the various demands from packaging industry.

It is known that random heterophasic propylene copolymers (RAHECOs) are a generally suitable class of soft base polymers applicable for cast and blown film applications.

Many different types of heterophasic systems have been described depending on the individual desire.

WO 2013079457 A1 describes a polypropylene composition having a $MFR_2$ in the range of 0.5 to 6.0 g/10 min, comprising a propylene homopolymer, a random propylene copolymer, an elastomeric propylene copolymer, a polyethylene and an alpha-nucleating agent, wherein the polypropylene composition is a heterophasic system in which the propylene homopolymer and the random propylene copolymer form the matrix of said system and the elastomeric propylene copolymer and the polyethylene are dispersed in said matrix. This composition achieves low haze values by adding significant amounts of LDPE, which on the other side negatively affects the stiffness.

EP 1358266 B1 describes polyolefin compositions with good transparency comprising
(a) 85-98 wt % based on the total weight of the composition of a heterophasic propylene/α-olefin copolymer comprising a polymer or copolymer of propylene and an α-olefin with 0-15 mol % of the α-olefin as matrix polymer and a propylene/α-olefin rubber copolymer comprising 20-80 mol % of the α-olefin and
(b) 15-2 wt % based on the total weight of the composition of an ethylene homopolymer, the ethylene homopolymer having a density lower than 0.920 g/cm$^3$.

Such compositions show quite low impact strength at 23° C. of around 11 kJ/m$^2$.

WO 2017/198639 describes the use of ethylene based plastomers for modifying random heterophasic copolymers in order to achieve an improved balance between mechanical and optical properties. WO 2017/198639 only mentions haze and flexural modulus, but is silent in view of Charpy notched impact strength and dart drop impact.

WO 2019/121597 suggest a blend of a heterophasic polypropylene, comprising a matrix being a propylene homopolymer and an elastomeric propylene-ethylene copolymer dispersed in said matrix, and a bimodal metallocene linear low-density polyethylene. The fraction soluble in cold xylene (XCS) of the heterophasic polypropylene has a rather low total comonomer content of ~15.0 wt %, which is a disadvantage for the softness of the material.

These compositions show still quite low impact strength at 23° C. of around 30 kJ/m$^2$. Film properties like dart drop impact are not mentioned at all.

Thus, although a lot of work has be done in this field, there is still the need to provide polypropylene compositions with an optimized or improved balance between toughness, softness and haze.

The finding of the present invention is to provide a polypropylene composition comprising a blend of (A) a random heterophasic polypropylene (RAHECO), having a matrix being a propylene copolymer and an elastomeric propylene-ethylene copolymer dispersed in said matrix, and (B) a copolymer of propylene and 1-hexene (PHC).

SUMMARY OF THE INVENTION

The present invention is therefore directed to a polypropylene composition comprising a blend of
(A) 50.0 to 99.0 wt. % of a random heterophasic propylene copolymer (RAHECO), said random heterophasic propylene copolymer (RAHECO) comprising a matrix (M) being a random propylene copolymer (R-PP) and an elastomeric propylene copolymer (E) dispersed in said matrix (M), said random heterophasic propylene copolymer (RAHECO) having
   (i) a melting temperature in the range of from 130 to 155° C.,
   (ii) an $MFR_2$ (230° C., 2.16 kg, ISO 1133) in the range of from 0.1 to 10.0 g/10 min
   (iii) a xylene cold soluble (XCS) fraction, measured according to ISO 16152 at 25° C. in the range of from 15.0 to 45.0 wt % and
   (iv) an intrinsic viscosity of the xylene cold soluble (XCS) fraction, measured according to ISO 1628-1 (135° C., in decaline) in the range of from 1.2 to 4.5 dl/g and
(B) 1.0 to 50.0 wt % of a copolymer of propylene and 1-hexene (PHC),
   wherein the copolymer of propylene and 1-hexene (PHC) has an 1-hexene content in the range of from 2.0 to 12.0 wt % and a $MFR_2$ (230° C., 2.16 kg, ISO 1133) in the range
of from 0.4 to 12.0 g/10 min,
wherein the polypropylene composition has a $MFR_2$ (230° C., 2.16 kg, ISO 1133) in the range of from 0.2 to 12.0 g/10 min.

In a further embodiment, the present invention is related to a process for the preparation of such polypropylene compositions comprising the following stages I), II) and III):

I) preparing (A) the random heterophasic propylene copolymer (RAHECO) including the steps (i)+(ii)
(i) preparation of the matrix (M) phase of the random heterophasic propylene copolymer (RAHECO), wherein stage (i) comprises the following step:

a) polymerization of propylene with ethylene or 1-butene to afford a random propylene copolymer, step a) being conducted in at least one slurry phase reactor at a reactor temperature of between 62 and 85° C. and (ii) preparation of the elastomeric propylene copolymer (E) of the random heterophasic propylene copolymer (RAHECO), wherein stage (ii) comprises the following step:

b) polymerization of propylene with at least one comonomer selected from ethylene and a $C_4$-$C_{12}$ alpha-olefin to result in an olefin-propylene copolymer, step b) being conducted in at least one gas phase reactor at a reactor temperature of between 60 and 95° C., II) preparing (B) the propylene-1-hexene copolymer (PHC) by polymerization of propylene and 1-hexene in at least two reactors connected in series and III) blending (A) and (B). i.e. the random heterophasic propylene copolymer (RAHECO) with the propylene-1-hexene random copolymer (PHC) by mechanical blending.

In an additional embodiment the present invention is related to the use of such polypropylene compositions for the production of blown or cast films, especially blown films.

The present invention is therefore further directed to a film, preferably blown film, comprising the polypropylene composition as described above.

The special combination of components (A) and (B) enables compositions having improved stiffness/haze/toughness balance compared to other heterophasic polypropylene compositions, which provides unique advantages for films as described in detail below.

DETAILED DESCRIPTION OF THE INVENTION

In the following the individual components encompassed by the present invention are defined in more detail.

The particular polypropylene composition of the present invention comprises at least component (A) being a random heterophasic propylene copolymer (RAHECO) comprising a matrix (M) being a being a propylene copolymer (R-PP) and an elastomeric propylene copolymer (E) dispersed in said matrix (M); and component (B) being a copolymer (PHC) of propylene and 1-hexene; each component being defined as above and in more detail below.

The term "polypropylene composition" used herein denotes compositions comprising the random heterophasic propylene copolymer (RAHECO) and the copolymer of propylene and 1-hexene (PHC).

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene copolymer is present in such an amount that it can form a continuous phase which can act as a matrix.

(A) Random Heterophasic Propylene Copolymer (RAHECO)

As described above, the polypropylene composition of the present invention comprises 50.0 to 99.0 wt %, preferably 52.0 to 97.0 wt %, more preferably 54.0 to 96.0 wt %, based on the total amount of the composition, of a random heterophasic propylene copolymer (RAHECO) comprising at least a matrix (M) being a propylene copolymer (R-PP) and an elastomeric propylene copolymer (E) dispersed in said matrix (M).

Ad Matrix (M)

The RAHECO comprises, based on the total amount of the RAHECO, 55.0 to 90.0 wt. % of matrix (M) being a propylene copolymer (R-PP) comprising propylene monomers and 1.0 to 6.5 wt % of at least one comonomer selected from ethylene or 1-butene, having a $MFR_2$, (230° C., 2.16 kg, ISO 1133) in the range of 0.1 to 15.0 g/10 min and a melting temperature in the range of 135 to 155° C. as measured according to ISO 11357-3.

Apparent from the wording "propylene copolymer", said polymer must comprises apart from propylene other monomer units. Accordingly, the random propylene copolymer (R-PP) comprises monomers copolymerizable with propylene, i.e. comonomers such as ethylene or 1-butene. Preferably the random propylene copolymer (R-PP) according to this invention comprises, especially consists of, monomers copolymerizable with propylene from the group consisting of ethylene and 1-butene. In a preferred embodiment, the random propylene copolymer (R-PP) comprises units derivable from ethylene and propylene only.

Accordingly, the random propylene copolymer (R-PP) has a comonomer content in the range of 1.0 to 6.5 wt %, preferably in the range of 1.5 to 6.0 wt %, more preferably in the range of 2.5 to 5.0 wt %.

The random propylene copolymer (R-PP) has a melt flow rate ($MFR_2$) in the range of 0.1 to 15.0 g/10 min. The $MFR_2$ for the random propylene copolymer (R-PP) is determined according to ISO 1133 at a temperature of 230° C. and under a load of 2.16 kg. It is preferred that the random propylene copolymer (R-PP) has an $MFR_2$ in the range of 0.3 to 10.0 g/10 min, more preferably in the range of 0.4 to 5.0 g/10 min.

The random propylene copolymer (R-PP) has a melting temperature in the range of 135 to 155° C. as measured according to ISO 11357-3, preferably in the range of 138 to 152° C., more preferably in the range of 140 to 150° C.

The random propylene copolymer (R-PP) may comprise, preferably consists of, two different fractions. Accordingly it is preferred that the random propylene copolymer (R-PP) comprises, more preferably consists of, a first random propylene copolymer fraction (R-PP1) and a second random propylene copolymer fraction (R-PP2), both fractions differ in the melt flow rate and/or in the comonomer content, the latter preferred.

In one embodiment, the first random propylene copolymer fraction (R-PP1) is the comonomer lean fraction whereas the second random propylene copolymer fraction (R-PP2) is comonomer rich fraction.

Accordingly the random propylene copolymer (R-PP) comprises, preferably consists of, (a) a first random propylene copolymer fraction (R-PP1) and (b) a second random propylene copolymer fraction (R-PP2).

Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

Preferably, the first random propylene copolymer fraction (R-PP1) has a comonomer content in the range of equal or more than 0.5 to equal or below 5.5 wt %, more preferably in the range of equal or more than 1.0 to equal or below 4.0 wt %, still more preferably in the range of equal or more than 1.5 to equal or below 3.5 wt %, preferably with the proviso that the comonomer content of the first random propylene copolymer fraction (R-PP1) is lower, preferably at least by 0.5 wt % lower, than the comonomer content of the second random propylene copolymer fraction (R-PP2).

Accordingly it is appreciated that the second random propylene copolymer fraction (R-PP2) has a comonomer content in the range of equal or more than 1.0 to equal or below 8.0 wt %, more preferably in the range of equal or more than 2.0 to equal or below 7.0 wt %, still more preferably in the range of equal or more than 3.5 to equal or below 6.0 wt %.

The polypropylene constituting the matrix in this case can be unimodal or multimodal, e.g. bimodal. When the matrix is bimodal, the first polypropylene fraction (R-PP1) and the second polypropylene fraction (R-PP2) differ, as stated above, at least in their melt flow rate and/or in their comonomer content.

"Multimodal", like "bimodal" describes a probability distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors have each their own molecular weight distribution, which may considerably differ from one another. The molecular weight distribution curve of the resulting final polymer can be seen as super-imposing of molecular weight distribution curves of the individual polymer fractions, which will, accordingly, show distinct maxima, or at least be distinctively broadened compared with the curves for individual fractions. A polymer showing such molecular weight distribution curve is called bimodal, or multimodal, respectively.

Moreover, it is preferred that the amount of xylene solubles of the propylene copolymer matrix (M) is not too high. Xylene solubles are the part of the polymer soluble in cold xylene determined by dissolution in boiling xylene and letting the insoluble part crystallize from the cooling solution (determined at 25° C. according to ISO 16152, 2005). The xylene solubles fraction contains polymer chains of low stereo-regularity and is an indication for the amount of non-crystalline areas. Accordingly, it is preferred that the xylene solubles fraction of the propylene copolymer matrix is in the range of 0.5 wt % to below 10.0 wt %, more preferably in the range of 0.7 wt % to 9.0 wt %. In an even more preferred embodiment the xylene solubles fraction is in the range of 0.8 wt % to 8.5 wt %.

The polypropylene composition according to the invention comprises 55.0 to 90.0 wt % of the matrix (M) being a propylene copolymer (R-PP), preferably 60.0 to 89.0 wt %, and more preferably 65.0 to 88.0 wt %. The weight percentages are relative to the total weight of the random heterophasic propylene copolymer (RAHECO) comprising the matrix (M) and an elastomeric propylene copolymer (E) dispersed in said matrix (M).

Ad Elastomeric Propylene Copolymer (E)

The RAHECO comprises, based on the total amount of the RAHECO, 10.0 to 45.0 wt % of the elastomeric propylene copolymer (E), preferably 11.0 to 40.0 wt % and more preferably the 12.0 to 35.0 wt %.

The elastomeric propylene copolymer (E) preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer phase (E) comprises units derivable from ethylene and propylene only.

The elastomeric propylene copolymer (E) has a comonomer content, preferably ethylene content, in the range of 25.0 to 50.0 wt %, preferably in the range of 30.0 to 48.0 wt % and more preferably in the range of 32.0 to 45.0 wt %. Thus, the propylene content in the elastomeric propylene copolymer (E) is in the range of 50.0 to 75.0 wt %, preferably in the range of 52.0 to 70.0 wt % and more preferably in the range of 55.0 to 68.0 wt %.

Like the matrix (M), the elastomeric propylene copolymer (E) can be unimodal or multimodal, like bimodal. In a preferred embodiment, the elastomeric propylene copolymer (E) is unimodal.

It is appreciated that the elastomeric propylene copolymer (E) has an intrinsic viscosity (IV) measured according to ISO 1628-1 (at 135° C. in decalin) in the range of equal or more than 0.7 to equal or less than 3.0 dl/g, more preferably in the range of equal or more than 0.8 to equal or less than 2.8 dl/g, still more preferably in the range of equal or more than 1.0 to equal or less than 2.6 dl/g, like in the range of 1.2 to 2.5 dl/g.

Ad Random Heterophasic Propylene Copolymer (RAHECO)

As stated above the random heterophasic copolymer (RAHECO) comprises at least a matrix (M) being a being a propylene copolymer (R-PP) and an elastomeric propylene copolymer (E) dispersed in said matrix (M). Suitable comonomers for the matrix (M) and the elastomeric propylene copolymer (E) have been described above.

In a most preferred embodiment, the matrix (M) as well as the elastomeric propylene copolymer (E) comprise units derivable from ethylene and propylene only.

Accordingly, the matrix (M) is preferably a random ethylene propylene copolymer and the elastomeric propylene copolymer (E) is preferably an ethylene propylene rubber (EPR).

The random heterophasic copolymer (RAHECO) has a melt flow rate $MFR_2$ (230° C., 2.16 kg) measured according to ISO 1133 in the range of equal or more than 0.1 to 10.0 g/10 min, preferably in the range of 0.3 to 7.0 g/10 min, more preferably in the range of 0.4 to 5.0 g/10 min and even more preferably in the range of 0.5 to 3.0 g/10 min.

Preferably, the final melt flow rate of the random heterophasic propylene copolymer (RAHECO) is adjusted during the polymerization process. Accordingly, the reactor-made random heterophasic propylene copolymer (RAHECO) has the melt flow rate as defined above or in the claims.

"Reactor-made random heterophasic propylene copolymer (RAHECO)" denotes herein that the melt flow rate of the random heterophasic propylene copolymer (RAHECO) has not been modified on purpose by post-treatment. Accordingly, in preferred embodiments the random heterophasic propylene copolymer (RAHECO) is non-visbroken, particularly not visbroken using peroxide. Accordingly, the melt flow rate is not increased by shortening the chain length of the random heterophasic propylene copolymer (RAHECO) according to this invention by use of peroxide. Thus, it is preferred that the random heterophasic propylene copolymer (RAHECO) does not contain any peroxide and/or decomposition product thereof.

The total content of comonomers, i.e. the sum of content of ethylene and alpha-olefins with 4 to 10 C-atoms, preferably the ethylene content, in the total random heterophasic propylene copolymer (A) (RAHECO) is preferably in the range of 2.5 to 20.0 wt %, more preferably in the range of 3.0 to 15.0 wt % and even more preferably in the range of 5.0 to 12.0 wt %. It is particularly preferred that the co-monomers are ethylene co-monomers only.

The random heterophasic propylene copolymer (RAHECO) may preferably have a melting temperature ($T_m$) in the range of from 130 to 155° C., more preferably in the range of from 135 to 150° C., even more in the range of from 138 to 145° C.

The xylene cold soluble (XCS) fraction of the random heterophasic propylene copolymer (RAHECO) measured according to ISO 16152 at 25° C., is typically in the range of 15.0 to 45.0 wt %, preferably in the range from 18.0 to 40.0 wt % and more preferably in the range from 20.0 to 35.0 wt %.

The xylene cold soluble (XCS) fraction of the random heterophasic propylene copolymer (RAHECO) preferably has an intrinsic viscosity (IV) measured according to ISO 1628-1 (at 135° C. in decalin) in the range of 1.2 to 4.5 dl/g, more preferably in the range of 1.5 to 4.2 and even more preferably in the range of 2.0 to 4.0 dl/g.

Generally, the xylene cold soluble (XCS) fraction of the random heterophasic propylene copolymer (RAHECO) has a comonomer, preferably ethylene, content in the range of 25.0 to 50.0 wt %, preferably in the range of 30.0 to 47.0 wt % and more preferably in the range of 32.0 to 42.0 wt %.

The random heterophasic propylene copolymer (RAHECO) preferably has a flexural modulus (FM) in the range of 300 to 800 MPa, as measured according to ISO 178 on injection moulded specimens. It is preferred that the random heterophasic propylene copolymer (RAHECO) has a flexural modulus in the range of 330 to 750 MPa, more preferably in the range of 350 to 700 MPa.

The random heterophasic propylene copolymer (RAHECO) may comprise further non-polymeric components, e.g. additives for different purposes.

The following are optional additives: process and heat stabilisers, pigments and other colouring agents allowing retaining transparency, antioxidants, antistatic agents, slip agents, nucleating agents, antiblocking agent, UV stabilisers and acid scavengers. Depending on the type of additive, these may be added in an amount of 0.001 to 3.0 wt %, based on the weight of the random heterophasic propylene copolymer (RAHECO).

Preparation of the Random Heterophasic Propylene Copolymer (RAHECO)

The random heterophasic propylene copolymer (RAHECO) may be prepared by any suitable process, including in particular blending processes such as mechanical blending, including mixing and melt blending processes and any combinations thereof as well as in-situ blending during the polymerization process. These can be carried out by methods known to the skilled person, including batch processes and continuous processes.

Preparing the random heterophasic propylene copolymer (RAHECO) preferably includes at least the steps of
(i) preparation of the matrix (M) phase of the random heterophasic propylene copolymer (RAHECO) (A), wherein stage (i) comprises at least the following step:
a) polymerization of propylene with at least one comonomer selected from ethylene and 1-butene to afford a random propylene copolymer, step a) being conducted in at least one slurry phase reactor at a reactor temperature of between 62 and 85° C. and
(ii) preparation of the disperse phase (i.e. the elastomeric propylene copolymer (E)) of the random heterophasic propylene copolymer (RAHECO), wherein stage (ii) comprises the following step:
b) co-polymerization of propylene with at least one comonomer selected from ethylene and a C4-012 alpha-olefin to result in an olefin-propylene copolymer, step b) being conducted in at least one gas phase reactor at a reactor temperature of between 60 and 95° C.

The random heterophasic propylene copolymer (RAHECO) is preferably prepared by a sequential polymerization process, as described below, in the presence of a catalyst system comprising a Ziegler-Natta Catalyst (ZN-C), a co-catalyst (Co) and optionally an external donor (ED), as described below.

The term "sequential polymerization system" according to this invention indicates that the random heterophasic propylene copolymer (RAHECO) is produced in at least two, optionally three, reactors connected in series. Accordingly, the present polymerization system comprises at least a first polymerization reactor (R1) and a second polymerization reactor (R2) and optionally a third polymerization reactor (R3).

The term "polymerization reactor" shall indicate that the main polymerization takes place. The polymerization process may further comprise pre- and/or post-reactor stages. Pre-reactor stages comprise typically pre-polymerization reactors.

Preferably, at least one of the two polymerization reactors (R1) and (R2) is a gas phase reactor (GPR). More preferably, the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention, the slurry reactor (SR) is preferably a (bulk) loop reactor (LR).

In this first polymerization reactor (R1) preferably the first random propylene copolymer fraction (R-PP1) of the matrix (M) is produced.

Preferably, the random propylene copolymer of the first polymerization reactor (R1), i.e. the first random propylene copolymer fraction (R-PP1), more preferably the polymer slurry of the loop reactor (LR) containing the first random propylene copolymer fraction (R-PP1), is directly fed into the second polymerization reactor (R2), i.e. into the (first) gas phase reactor (GPR1), without a flash step between the stages. By "direct feed" is meant a process wherein the content of the loop reactor is led directly to the next gas-phase reactor stage. This kind of direct feed is described e.g. in EP 887379 A, EP 887380 A, EP 887381 A and EP 991684 A.

Alternatively, the random propylene copolymer of the first polymerization reactor (R1), i.e. the first random propylene copolymer fraction (R-PP1), more preferably polymer slurry of the loop reactor (LR) containing the first random propylene copolymer fraction (R-PP1), may be also directed into a flash step or through a further concentration step before fed into the second polymerization reactor (R2), i.e. into the 1% gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and the optional third polymerization reactor (R3) and any subsequent reactor, if desired, for instance, a fourth polymerization reactor (R4) are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 m/sec.

Thus, it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3) are gas phase reactors (GPRs).

Accordingly, in the present process at least two polymerization reactors (R1) and (R2), preferably at least three polymerization reactors (R1), (R2) and (R3) or if desired also four polymerization reactors (R1), (R2), (R3) and (R4), namely a slurry reactor (SR), like loop reactor (LR) and a (first) gas phase reactor (GPR1) as well as, in a preferred embodiment, a second gas phase reactor (GPR2), and optionally a third gas phase reactor (GPR3) connected in series are used.

Prior to the slurry reactor (SR) a pre-polymerization reactor is placed. As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen. Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the third reactor (R3) and the optional the fourth reactor (R4) is in the range of 60 to 95° C., more preferably in the range of 65 to 90° C.

Preferably, the operating temperature in the second polymerization reactor (R2) is equal to or higher than the operating temperature in the first polymerization reactor (R1). Accordingly, it is preferred that the operating temperature
    (a) in the first polymerization reactor (R1) is in the range of 62 to 85° C., more preferably in the range of 65 to 82° C., still more preferably in the range of 67 to 80° C., like 70 to 80° C.; and
    (b) in the second polymerization reactor (R2) is in the range of 65 to 90° C., more preferably in the range of 68 to 90° C., still more preferably in the range of 70 to 88° C., with the proviso that the operating temperature in the in the second polymerization reactor (R2) is equal or higher to the operating temperature in the first polymerization reactor (R1).

Typically, the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 10 to 40 bar. Preferably, hydrogen is added in each polymerization reactor in order to control the molecular weight, i.e. the melt flow rate MFR.

Preferably, the average residence time is rather long in the polymerization reactors (R1) and (R2). In general, the average residence time (1) is defined as the ratio of the reaction volume (VR) to the volumetric outflow rate from the reactor (Qo) (i.e. VR/Qo), i.e T=VR/Qo [tau=VR/Qo]. In case of a loop reactor the reaction volume (VR) equals to the reactor volume.

Accordingly, the average residence time (i) in the first polymerization reactor (R1) is preferably at least 5 min, more preferably in the range of 15 to 80 min, still more preferably in the range of 20 to 60 min, like in the range of 24 to 50 min, and/or the average residence time (i) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (i) in the third polymerization reactor (R3) or in the fourth polymerization reactor (R4), if present, is preferably at least 30 min, more preferably in the range of 30 to 120 min, still more preferably in the range of 40 to 100 min, like in the range of 50 to 90 min.

As mentioned above, the preparation of the random heterophasic propylene copolymer (RAHECO) comprises in addition to the (main) polymerization of the propylene polymer in the at least three polymerization reactors (R1, R2, optional R3 and optional R4) prior thereto a pre-polymerization in a pre-polymerization reactor (PR) upstream to the first polymerization reactor (R1).

In the pre-polymerization reactor (PR) a polypropylene (Pre-PP) is produced. The prepolymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C. The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor. The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the prepolymerization reactor (PR) is obtained. Preferably, the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the present invention and within the skilled knowledge.

Accordingly, the random heterophasic propylene copolymer (RAHECO) is preferably produced in a process comprising the following steps under the conditions set out above:

a) In the pre-polymerization, a mixture (MI) of the Ziegler-Natta catalyst (ZN-C) and the polypropylene (Pre-PP) produced in the pre-polymerization reactor (PR) is obtained. Preferably, the Ziegler-Natta catalyst (ZN-C) is (finely) dispersed in the polypropylene (Pre-PP). Subsequent to the pre-polymerization, the mixture (MI) of the Ziegler-Natta catalyst (ZNC) and the polypropylene (Pre-PP) produced in the pre-polymerization reactor (PR) is transferred to the first reactor (R1). Typically, the total amount of the polypropylene (Pre-PP) in the final random heterophasic propylene copolymer (RAHECO) is rather low and typically not more than 5.0 wt %, more preferably not more than 4.0 wt %, still more preferably in the range of 0.5 to 4.0 wt %, like in the range 1.0 of to 3.0 wt %.

b) In the first polymerization reactor (R1), i.e. in a loop reactor (LR), propylene is polymerized with at least one comonomer selected from ethylene and 1-butene, obtaining a first propylene copolymer fraction (R-PP1) of the random propylene copolymer (R-PP), transferring said first propylene copolymer fraction (R-PP1) to a second polymerization reactor (R2), c) in the second polymerization reactor (R2) propylene is polymerized in the presence of the first propylene copolymer fraction (R-PP1), obtaining a second propylene copolymer fraction (R-PP2) of the random propylene copolymer. Said fraction [R-PP1+R-PP2] is further transferred to a third polymerization reactor R3 obtaining the elastomeric propylene copolymer (E) in the presence of all fractions produced in earlier steps.

Optionally, it is possible to transfer the entire polymer produced to a fourth polymerization reactor R4.

By using—as stated above—a loop reactor and at least one gas phase reactor in serial configuration and working at different conditions, a multimodal (e.g. bimodal) propylene copolymer matrix (M) can be obtained. If the loop reactor and the first gas phase reactor are run under conditions yielding similar polymers, a unimodal matrix can be obtained.

A preferred multistage process is a "loop-gas phase" process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315. A further suitable slurry-gas phase process is the Spheripol® process of Basell.

The catalyst components are preferably all introduced to the prepolymerization step. However, where the solid catalyst component (i) and the co-catalyst (ii) can be fed separately it is possible that only a part of the co-catalyst is introduced into the prepolymerization stage and the remaining part into subsequent polymerization stages. Also in such cases it is necessary to introduce so much co-catalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor. The precise control of the prepolymerization conditions and reaction parameters is within the skill of the art.

According to the present invention, the random heterophasic propylene copolymer (RAHECO) is obtained by a multistage polymerization process, as described above, in the presence of a catalyst system. In the process described above a Ziegler-Natta catalyst (ZN-C) for the preparation of the random heterophasic polypropylene copolymer (RAHECO) is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10.000 kPa, in particular 2.500 to 8.000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more. Such high-yield Ziegler-Natta catalyst (ZN-C) can comprise a non-phthalate based internal donor preferably selected from optionally substituted malonates, maleates, succinates, glutarates, cyclohexene-1,2-dicarboxylates, benzoates, a diether and derivatives and/or mixtures thereof, preferably from citraconates, or a phthalate-based donor, like DEHP, etc., or mixtures therefrom as internal donor (ID). The Ziegler-Natta catalyst (ZN-C) is preferably used in association with an alkyl aluminum co-catalyst (Co) and optionally external donors (ED). As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula

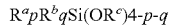

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)Si(OCH$_3$)$_2$ and (cyclopentyl)$_2$Si(OCH$_3$)$_2$, or of general formula

wherein $R^1$ and $R^2$ can be the same or different a represent a hydrocarbon group having 1 to 12 carbon atoms.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^1$ and $R^2$ are an ethyl group.

Especially preferred external donors (ED) are the dicyclopentyl dimethoxy silane donor (D-donor) or the cyclohexylmethyl dimethoxy silane donor (C-Donor). In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminum, like triethylaluminum (TEAL), dialkyl aluminum chloride or alkyl aluminum dichloride or mixtures thereof. In one specific embodiment the co-catalyst (Co) is triethylaluminum (TEAL).

Preferably, the ratio between the co-catalyst (Co) and the external donor (ED) [Co/ED] and/or the ratio between the co-catalyst (Co) and the transition metal (TM) [Co/TM] should be carefully chosen. Accordingly, (a) the molar ratio of co-catalyst (Co) to external donor (ED) [Co/ED] must be in the range of 5 to 45, preferably is in the range of 5 to 35, more preferably is in the range of 5 to 25; and optionally (b) the molar ratio of co-catalyst (Co) to titanium compound (TC) [Co/TC] must be in the range of above 80 to 500, preferably is in the range of 100 to 350, still more preferably is in the range of 120 to 300.

(B) Copolymer of Propylene and 1-hexene (PHC)

The polypropylene composition of the present invention comprises, besides component (A) described above, component (B) which is a copolymer of propylene and 1-hexene in an amount of from 1.0 to 50.0 wt. %, preferably from 2.0 to 48.0 wt. % and more preferably from 4.0 to 46.0 wt. %, like 5.0 to 45.0 wt %, based on the total amount of the composition.

The copolymer of propylene and 1-hexene is preferably a propylene-1-hexene random copolymer and has an 1-hexene content in the range of from 2.0 to 12.0 wt %, preferably in the range of from 2.5 to 10.0 wt %, more preferably in the range of from 3.0 to 8.0 wt % and yet more preferably 4.0 to 7.0 wt %.

Throughout the present invention, the amount of 1-hexene for the propylene-1-hexene copolymer (PHC) is calculated based on the total amount of the propylene 1-hexene copolymer (PHC).

The term "propylene-1-hexene copolymer" according to this invention indicates the propylene 1-hexene copolymer contains only units derivable from propylene and 1-hexene. The term "propylene-1-hexene copolymer" excludes also the option that a propylene homopolymer can be present. In other words, the term "propylene-1-hexene copolymer" defines a polymer, which contains solely propylene-1-hexene copolymer chains.

The MFR$_2$ (230° C., 2.16 kg, ISO1133) of the propylene-1-hexene random copolymer is in the range of from 0.4 to 12.0 g/10 min, preferably in the range of from 0.5 to 10.0 g/10 min, more preferably in the range of from 0.7 to 8.0 g/10 min and yet more preferably in the range of from 0.8 to 5.0 g/10 min, like 1.0 to 3.0 g/10 min.

Preferably, the copolymer of propylene and 1-hexene is featured by a rather high xylene cold soluble (XCS) content. Accordingly, the propylene-1-hexene random copolymer (PHC) has a xylene cold soluble (XCS) content determined at 25° C. according to ISO 16152 in the range of from 10.0 to 35.0 wt. %, more preferably 15.0 to 32.0 wt. %, even more preferably 18.0 to 30.0 wt. %, such as 20.0 to 28.0 wt. %, based on the total weight of the propylene 1-hexene copolymer (PHC).

Further it is preferred that the xylene cold soluble (XCS) fraction of the propylene-1-hexene copolymer (PHC) has a 1-hexene content in the range of 4.5 to 15.0 wt %, more preferably 5.0 to 12.0 wt %, yet more preferably 6.0 to 10.0 wt %, based on the total weight of the xylene cold soluble (XCS) fraction of the propylene 1-hexene copolymer (PHC).

The melting temperature (Tm) of the propylene-1-hexene copolymer (PHC) is preferably at least 130° C., more preferably of at least 133° C. Thus, it is in particular appreciated, that the melting temperature (Tm) of the propylene-1-hexene copolymer (PHC) is in the range of 130 to 145° C., more preferably in the range of 133 to 140° C.

Preferably, the propylene-1-hexene copolymer (PHC) has a rather narrow molecular weight distribution. Accordingly, it is preferred that the propylene-1-hexene copolymer (PHC) has a molecular weight distribution (Mw/Mn) characterized by a ratio between weight average and number average molecular weight, of not more than 4.5, more preferably not more than 4.3, yet more preferably in the range of 2.0 to 4.5, still more preferably in the range of 2.5 to 4.3 and still yet more preferably in the range of 2.8 to 4.0.

According to a preferred embodiment, the copolymer of propylene and 1-hexene (PHC) comprises (i) a first random propylene copolymer of propylene and 1-hexene, and (ii) a second random propylene copolymer of propylene and 1-hexene.

Accordingly, the propylene-1-hexene copolymer (PHC) comprises at least two fractions, namely a 1st propylene-1-hexene copolymer (PHC-1) and a 2nd propylene-1-hexene copolymer (PHC-2).

Preferably that the total amount of the propylene-1-hexene copolymers (PHC-1) and (PHC-2) together is at least 90.0 wt %, more preferably at least 95.0 wt %, yet more preferably at least 98.0 wt %, based on the total weight of the propylene-1-hexene copolymer (PHC). In a specific embodiment, the propylene-1-hexene copolymer (PHC) consists of the 1st propylene-1-hexene copolymer (PHC-1) and the 2nd propylene-1-hexene copolymer (PHC-2).

In addition it is preferred that the weight ratio [(PHC-1)/(PHC-2)] between the propylene 1-hexene copolymers (PHC-1) and (PHC-2) is in the range of 20/80 to 80/20, more preferably in the range of 25/75 to 60/40, yet more preferably in the range of 30/70 to 50/50.

Further, it is preferred that the 1st propylene-1-hexene copolymer (PHC-1) is the 1-hexene lean fraction whereas the 2nd propylene-1-hexene copolymer (PHC-2) is the 1-hexene rich fraction.

Thus, according to a preferred embodiment, the first propylene-1-hexene copolymer (PHC-1) is a copolymer of propylene and a 1-hexene, having a 1-hexene content in the range of 0.1 to 3.9 wt %, preferably in the range of 0.5 to 3.5 wt %, more preferably in the range of 0.8 to 3.0 wt % and still more preferably in the range of 1.0 to 2.5 wt %, and the second propylene-1-hexene copolymer (PHC-2) is a copolymer of propylene and 1-hexene having an 1-hexene content in the range of 4.0 to 15.0 wt %, preferably in the range of 5.0 to 13.0 wt %, more preferably in the range of 6.0 to 12.0 wt % and still more preferably in the range of 6.5 to 10.0 wt %.

Even more preferably, with regard to the melt flow rate $MFR_2$, the copolymer of propylene and 1-hexene (PHC) may fulfil in-equation (1), still more preferably in-equation (1a), even more preferably in-equation (1b), $$MFR(PHC\text{-}2)/MFR(PHC\text{-}1) \leq 1.0 \tag{1}$$

$$0.5 \leq MFR(PHC\text{-}2)/MFR(PHC\text{-}1) \leq 1.0 \tag{1a}$$

$$0.6 \leq MFR(PHC\text{-}2)/MFR(PHC\text{-}1) \leq 0.9 \tag{1b}$$

wherein MFR(PHC-1) is the melt flow rate $MFR_2$ (230° C., 2.16 kg) determined according to ISO 1133 in [g/10 min] of the first random propylene copolymer (PHC-1) and MFR (PHC-2) is the melt flow rate $MFR_2$ (230° C., 2.16 kg) determined according to ISO 1133 in [g/10 min] of the propylene copolymer (PHC-2).

Further, it is appreciated that the first random propylene copolymer (PHC-1) may preferably have a melt flow rate $MFR_2$ (230° C., 2.16 kg) determined according to ISO 1133 in the range of 0.3 to 12.0 g/10 min, more preferably in the range of 0.5 to 9.0 g/10 min, still more preferably in the range of 0.7 to 6.0 g/10 min, like in the range of 1.0 to 3.0 g/10 min.

The second random propylene copolymer (PHC-2) may preferably have a melt flow rate $MFR_2$ (230° C., 2.16 kg) determined according to ISO 1133 in the range of 0.5 to 14.0 g/10 min, more preferably in the range of 0.7 to 11.0 g/10 min, still more preferably in the range of 0.9 to 8.0 g/10 min, like in the range of 1.1 to 5.0 g/10 min.

The propylene-1-hexene copolymer (PHC) is in particular obtainable, preferably obtained, by a process as defined in detail below.

It is preferred that the propylene-1-hexene copolymer (PHC) is obtained in the presence of a metallocene catalyst, especially in the presence of a metallocene catalyst as defined in detail below.

Still more preferably, the propylene-1-hexene copolymer (PHC) is obtained by a sequential polymerization process, especially by a sequential polymerization process as defined below, thereby using a metallocene catalyst, especially a metallocene catalyst as defined in detail below.

The metallocene catalyst can be a supported catalyst, using conventional supports or can be free from an external carrier. By free from an external carrier is meant that the catalyst does not contain an external support, such as an inorganic support, for example, silica or alumina, or an organic polymeric support material Preferably used are metallocene catalysts which are free from an external carrier.

Especially preferred metallocene catalysts for the preparation of the propylene-1-hexene copolymer (PCH) are those described in WO 2015/011135 A1. Also the process for its preparation according to this document may preferably be adopted.

Accordingly preferred metallocene complexes (procatalysts) are rac-dimethylsilanediylbis-[2-Me-4-(4-tBu-Ph)-1,5,6,7-tetrahydro-s-indacen-1-yl] $ZrCl_2$;

rac-dimethylsilanediylbis-(2-Me-4-Ph-5-OMe-6-tBu-Ind)$ZrCl_2$;

rac-anti-$Me_2Si$(2-Me-4-Ph-6-tBu-Ind)(2-Me-4-Ph-5-OMe-6-tBu-Ind)$ZrCl_2$;

rac-anti-$Me_2Si$(2-Me-4-(p-tBuPh)-Ind)(2-Me-4-Ph-5-OMe-6-tBu-Ind)$ZrCl_2$;

rac-anti-$Me_2Si$(2-Me-4-(3,5-di-tBuPh)-6-tBu-Ind)(2-Me-4-Ph-5-OMe-6-tBu-Ind)$ZrCl_2$;

rac-anti-$Me_2Si$(2-Me-4-(p-tBuPh)-Ind)(2-Me-4-Ph-5-OC6F5)-6-iPr-Ind)$ZrCl_2$;

rac-anti-Me(CyHex)Si(2-Me-4-Ph-6-tBu-Ind)(2-Me-4-Ph-5-OMe-6-tBu-Ind)$ZrCl_2$;

rac-anti-$Me_2Si$(2-Me-4-(3,5-di-tBuPh)-7-Me-Ind)(2-Me-4-Ph-5-OMe-6-tBu-Ind)$ZrCl_2$;

rac-anti-$Me_2Si$(2-Me-4-(3,5-di-tBuPh)-7-OMe-Ind)(2-Me-4-Ph-5-OMe-6-tBu-Ind)$ZrCl_2$;

rac-anti-$Me_2Si$(2-Me-4-(p-tBuPh)-6-tBu-Ind)(2-Me-4-Ph-5-OMe-6-tBu-Ind)$ZrCl_2$;

rac-anti-$Me_2Si$(2-Me-4-(p-tBuPh)-Ind)(2-Me-4-(4-tBuPh)-5-OMe-6-tBu-Ind)$ZrCl_2$;

rac-anti-$Me_2Si$(2-Me-4-(p-tBuPh)-Ind)(2-Me-4-(3,5-tBu2Ph)-5-OMe-6-tBu-Ind)$ZrCl_2$;

rac-anti-$Me_2Si$(2-Me-4-(p-tBuPh)-Ind)(2-Me-4-Ph-5-OiBu-6-tBu-Ind)$ZrCl_2$.

The most preferred metallocene complex is rac-anti-$Me_2Si$(2-Me-4-Ph-5-OMe-6-tBu-Ind)(2-Me-4-(p-tBuPh)-Ind)$ZrCl_2$.

Beside the metallocene complex, the metallocene catalyst comprises additionally a cocatalyst as defined in WO 2015/011135 A1. Accordingly, the preferred cocatalyst is methylaluminoxane (MAO) and/ or a borate.

It is especially preferred that the metallocene catalyst is unsupported, i.e. no external carrier is used. Regarding the preparation of such a metallocene complex, again reference is made to WO 2015/011135 A1.

It is in particular preferred that a catalyst is used as described in the example section.

In case the sequential polymerization is applied, the following polymerization conditions are preferred. The term "sequential polymerization process" indicates that the propylene-1-hexene copolymer (PHC) is produced in at least two reactors connected in series. More precisely the "term sequential polymerization process" indicates in the present application that the polymer of the first reactor (R1) is directly conveyed with unreacted comonomers to the second reactor (R2). Accordingly, decisive aspect of the present process is the preparation of the propylene-1-hexene copolymer (PHC) in at least two different reactors, wherein the reaction material of the first reactor (R1) is directly

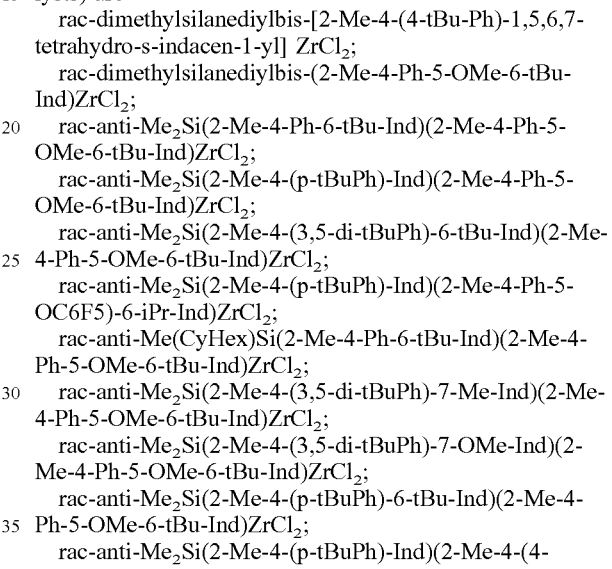

conveyed to the second reactor (R2). Thus, the present process comprises at least a first reactor (R1) and a second reactor (R2) and optionally a third reactor (R3). In one specific embodiment the instant process consists of two the polymerization reactors (R1) and (R2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

Preferably, in the first reactor (R1) the 1st propylene-1-hexene copolymer (PHC-1) and in the second reactor (R2) the 2nd propylene-1-hexene copolymer (PHC-2) is produced.

The condition (temperature, pressure, reaction time, monomer feed) in each reactor is dependent on the desired product, which is in the knowledge of a person skilled in the art.

As already indicated for the RAHECO, the first reactor (R1) is preferably a slurry reactor (SR), like a loop reactor (LR), whereas the second reactor (R2) is preferably a gas phase reactor (GPR-1). The subsequent reactors — if present — are also preferably gas phase reactors (GPR).

Again, the preferred multistage process is a "loop-gas phase" process, as developed by Borealis (known as BORSTAR® technology) and is described e.g. in patent literature, such as in EP 0887379, WO 92/12182 WO 2004/000899, WO 2004/111095, WO 99/24478, WO 99/24479 or in WO 00/68315. A further suitable slurry-gas phase process is the Spheripol® process of Basell.

Preferably, in the instant process for producing the propylene-1-hexene copolymer (PHC) as defined above the conditions for the first reactor (R1), i.e. the slurry reactor (SR), like a loop reactor (LR), where preferably the 1st propylene-1-hexene copolymer (PHC-1) is produced if present, may be as follows:

the temperature is within the range of 40° C. to 110° C., preferably between 60° C. and 100° C., 70 to 90° C.;
the pressure is within the range of 20 bar to 80 bar, preferably between 40 bar to 70 bar;
hydrogen can be added for controlling the molar mass in a manner known per se;
the 1-hexene/propylene ratio is preferably in the range of 6.0 to 18.0 mol/kmol, more preferably in the range of 8.0 to 15.0 mol/kmol.

Subsequently, the reaction mixture of the first reactor (R1) is transferred to the second reactor (R2), i.e. gas phase reactor (GPR1), where preferably the $2^{nd}$ propylene-1-hexene copolymer (PHC-2) is produced if present. The conditions in the second reactor (R2) are preferably as follows:

the temperature is within the range of 50° C. to 130° C., preferably between 60° C. and 100° C.,
the pressure is within the range of 5 bar to 50 bar, preferably between 15 bar to 40 bar,
hydrogen can be added for controlling the molar mass in a manner known per se.
the 1-hexene/propylene ratio is preferably in the range of 5.0 to 16.0 mol/kmol, more preferably in the range of 6.0 to 12.0 mol/kmol.

The residence time can vary in both reactor zones.

The conditions in the other gas phase reactors (GPR), if present, are similar to the second reactor (R2).

The present process may again also encompass a pre-polymerization prior to the polymerization in the first reactor (R1). The pre-polymerization can be conducted in the first reactor (R1), however it is preferred that the pre-polymerization takes place in a separate reactor, so called pre-polymerization reactor.

(C) Polypropylene Composition

The polypropylene composition according to the present invention can be obtained by (melt)-mixing the individual fractions, i.e. (A) the random heterophasic propylene copolymer (RAHECO) and (B) copolymer of propylene and 1-hexene (PHC). During the melt mixing suitable additives can additionally be added. For mixing, a conventional compounding or blending apparatus, e.g. a Banbury mixer, a 2-roll rubber mill, Buss-co-kneader, a single screw extruder with special mixing segments or a twin screw extruder may be used. The polymer composition recovered from the extruder is usually in the form of pellets.

In the blend for the polypropylene composition according to the present invention component (A) is present in an amount of from 50.0 to 99.0 wt % and component (B) is present in an amount of from 1.0 to 50.0 wt %.

Preferably, component (A) is present in an amount of from 52.0 to 98.0 wt % and more preferably in an amount of from 54.0 to 96.0 wt %.

Thus, component (B) is preferably present in an amount of from 2.0 to 48.0 wt % and more preferably in an amount of from 4.0 to 46.0 wt %.

The overall melt flow rate, i.e. the melt flow rate $MFR_2$ (230° C.) measured according to ISO 1133 of polypropylene composition is in a range of from 0.2 to 12.0 g/10 min, preferably in a range of from 0.5 to 8.0 g/10 min, more preferably in a range of from 0.8 to 5.0 g/10 min and even more preferably in a range of from 1.0 to 3.0 g/10 min.

It is appreciated that the inventive polypropylene composition preferably has a melting temperature Tm in the range of from 135° C. to 150° C., more preferably in the range of from 137° C. to 145° C., determined by differential scanning calorimetry (DSC) as described in the example section.

Additionally it is appreciated that the inventive polypropylene composition preferably has a crystallization temperature in the range of from 80° C. to 115° C., more preferably in the range of from 85° C. to 110° C. and even more preferably in the range of from 90° C. to 108° C. determined by differential scanning calorimetry (DSC) as described in the example section.

The polypropylene composition according to the present invention may have in addition one, preferably two or more preferably three of below properties a), b) and c):

a) The polypropylene composition may preferably exhibit a flexural modulus, determined according to ISO 178 on injection moulded specimens, in the range of from 400 to 1000 MPa, preferably from 500 to 900 MPa, more preferably from 550 to 800 MPa and even more preferably from 600 to 750 MPa.
b) The polypropylene composition may preferably exhibit a Charpy notched impact strength at 23° C., determined according to ISO 179 1eA, in the range of from 40 kJ/m$^2$ to 80 kJ/m$^2$, preferably from 45 to 75 kJ/m$^2$ and more preferably from 48 to 70 kJ/m$^2$.
c) The polypropylene composition may preferably exhibit a haze measured according to ASTM D1033 on a 1.0 mm thick plaque of below 75%, i.e. in the range of from 20 to below 75%, preferably from 25 to 72% and more preferably from 30 to 70%.

In one further embodiment, the polypropylene composition according to the present invention may have alternatively or in addition one, preferably two or more preferably three of below properties d), e) and f):

d) The polypropylene composition may preferably exhibit a Tensile modulus, in machine and transverse direction according to ISO 527-3 at 23° C. measured on 50 µm blown films, in the range of from 350 to 900 MPa, preferably from 400 to 80 MPa, more preferably from 450 to 750 MPa and even more preferably from 500 to 700 MPa.

e) The polypropylene composition may preferably exhibit a dart-drop impact strength (DDI) determined according to ASTM D1709, method A on a 50 µm blown film of at least 150 g up to 500 g, more preferably in the range of 180 to 450 g, still more preferably in the range of 200 to 400 g, like in the range of 220 to 380 g.

f) The polypropylene composition may preferably exhibit a haze measured according to ASTM D1033 on a 50 µm blown film of below 30%, i.e. in the range of from 2.0 to below 30%, preferably from 5.0 to 25.0% and more preferably from 8.0 to 20.0%.

Viewed from another aspect, it is a constant need to provide polypropylene compositions, which not only show improvements in one or two of these mechanical or optical properties. So it is desired to provide products with a well-balanced and continuously improved overall performance.

Such an improvement in the overall performance can be expressed by the optomechanical ability:

In view of the present invention optomechanical ability (OMA) is understood as the ratio of mechanical (especially dart-drop impact strength (DDI) and tensile (MD)) behaviour, to optical performance, namely haze, wherein the mechanical properties are targeted to be as high as possible and the optical performance in the sense of haze is desired to be as low as possible.

The optomechanical ability can be determined by multiplying Tensile Modulus (MD) and dart-drop impact strength (DDI) and putting this product in relation to haze determined on 50 µm blown film.

The optomechanical ability (OMA) is therefore determined according the formula given below:

$$OMA = \frac{\text{Tensile Modulus}(MD)[\text{MPa}] * DDI(g)}{\text{Haze}(50 \, \mu m) \, [\%]}$$

Thus, in one further embodiment of the present invention, the optomechanical ability (OMA) of the polypropylene composition according to the present invention, determined on 50 µm blown film, is at least 5000 [MPa*g/%] up to 30000 [MPa*g/%], such as in the range of from 6000 [MPa*g/%] up to 25000 [MPa*g/%], preferably in the range of from 7000 [MPa*g/%] up to 22000.

In a further embodiment the present invention is also related to a process for the preparation of such polypropylene compositions comprising the following stages I), II) and III):

I) preparing (A) the random heterophasic propylene copolymer (RAHECO) including the steps (i)+(ii)
  (i) preparation of the matrix (M) phase of the random heterophasic propylene copolymer (RAHECO), wherein stage (i) comprises the following step:
    a) polymerization of propylene with at least one comonomer selected from ethylene and 1-butene to afford a random propylene copolymer, step a) being conducted in at least one slurry phase reactor at a reactor temperature of between 62 and 85° C. and
  (ii) preparation of the elastomeric propylene copolymer (E) of the random heterophasic propylene copolymer (RAHECO), wherein stage (ii) comprises the following step:
    b) co-polymerization of propylene with at least one comonomer selected from ethylene and a C4-012 alpha-olefin to result in an olefin-propylene copolymer, step b) being conducted in at least one gas phase reactor at a reactor temperature of between 60 and 95° C., II) preparing (B) the propylene-1-hexene copolymer (PHC) by polymerization of propylene and 1-hexene in at least two reactors connected in series and III) blending (A) and (B), i.e. the random heterophasic propylene copolymer (RAHECO) with the propylene-1-hexene random copolymer (PHC) by mechanical blending.

Step I) and II) can be made in any sequence.

Preferably, in the process described above

I) the random heterophasic propylene copolymer (RAHECO) has been polymerized in the presence of a Ziegler-Natta catalyst (ZN-C) comprising compounds (TC) of a transition metal of Group 4 to 6 of the IUPAC Periodic Table of Elements, a Group 2 metal compound (MC) and an internal donor (ID), wherein said internal donor (ID) is a non-phthalic compound, preferably is a non-phthalic acid ester, more preferably a optionally substituted malonate, maleate, succinate, glutarate, cyclohexene-1,2-dicarboxylate, benzoate and derivatives and/or mixtures thereof, and even more preferably a citraconate, and II) the propylene-1-hexene random copolymer (PHC) has been polymerized in the presence of a metallocene catalyst.

(D) Article

The present invention is not only related to the composition itself, but also to its use and to articles comprising the inventive polypropylene composition.

The polypropylene composition of the present invention is, due to the improved property profile, e.g. improved balance of toughness, softness and haze, suitable for the preparation of a variety of articles, like films (blown and cast film, especially blown film) for flexible packaging systems, such as bags or pouches for food and pharmaceutical packaging or medical articles in general as well as extrusion blow moulded or injection stretch blow moulded articles, like bottles.

In an embodiment, the present invention is related to an article, the article being an unoriented mono-layer film comprising the inventive polypropylene composition. Accordingly the present invention is also directed to an article, the article being an unoriented mono-layer film, preferably a blown film, e.g. air cooled blown film, comprising at least 80 wt %, preferably comprising at least 85 wt %, yet more preferably comprising at least 90 wt %, of the instant polypropylene composition.

The above described polypropylene composition is especially suitable for the production of blown films.

Mono-layer films having a thickness of 5 to 300 µm, preferably 10 to 200 µm, more preferably 20 to 150 µm are suitable according to the present invention.

Films according to the present invention shall preferably be used for flexible packaging systems, such as bags or pouches for food and pharmaceutical packaging or medical articles in general.

The following definitions of terms and determination methods apply for the above general description of the invention as well as to the below examples unless otherwise defined.

Experimental Part

A. Measuring Methods

The following definitions of terms and determination methods apply for the above general description of the invention including the claims as well as to the below examples unless otherwise defined.

a) Comonomer Content Quantification of Poly(Propylene-Co-Ethylene) Copolymers

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., et al., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al., J. Mag. Reson. 187 (2007) 225; Busico, V., et al., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950).

With characteristic signals corresponding to 2,1 erythro regio defects observed (as described in L. Resconi, L. et al., Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the region-defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\delta\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

b) Cornonomer Content of 1-hexene for a Propylene 1-hexene Copolymer (PHC)

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.(Klimke, K., Parkinson, M., Piel, C., Kaminsky, W., Spiess, H. W., Wilhelm, M., Macromol. Chem. Phys. 2006; 207: 382., Parkinson, M., Klimke, K., Spiess, H. W., Wilhelm, M., Macromol. Chem. Phys. 2007; 208: 2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37: 813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$H = I\alpha B4/2$

The amount of 1-hexene incorporated in PHHP double consecutive sequences was quantified using the integral of the ααB4 site at 41.7 ppm accounting for the number of reporting sites per comonomer:

$HH = 2 \ast I\alpha\alpha B4$

When double consecutive incorporation was observed the amount of 1-hexene incorporated in PHP isolated sequences needed to be compensated due to the overlap of the signals αB4 and αB4B4 at 44.4 ppm:

$H = (I\alpha B4 - 2 \ast I\alpha\alpha B4)/2$

The total 1-hexene content was calculated based on the sum of isolated and consecutively incorporated 1-hexene:

$H\text{total} = H + HH$

When no sites indicative of consecutive incorporation observed the total 1-hexene comonomer content was calculated solely on this quantity:

$H\text{total} = H$

The total comonomer incorporation of 1-hexene in mole percent was calculated from the mole fraction in the usual manner:

$H[\text{mol \%}] = 100 \ast fH$

The total comonomer incorporation of 1-hexene in weight percent was calculated from the mole fraction in the standard manner:

$H[\text{wt \%}] = 100 \ast (fH \ast 84.16)/((fH \ast 84.16) + ((1-fH) \ast 42.08))$ Calculation of 1-hexene content of the propylene 1-hexene copolymer (PHC-2):

$$\frac{C(PHC) - w(P) \times C(A)}{w(B)} = C(B)$$

wherein w(A) is the weight fraction of the propylene 1-hexene copolymer (PHC-1);

w(B) is the weight fraction of the propylene 1-hexene copolymer (PHC-2);

C(A) is the 1-hexene content [in wt %] measured by $^{13}C$ NMR spectroscopy of the propylene 1-hexene copolymer (PHC-1);

C(PHC) is the 1-hexene content [in wt %] measured by $^{13}C$ NMR spectroscopy of the propylene 1-hexene copolymer (PHC);

C(B) is the calculated 1-hexene content [in wt %] measured by $^{13}C$ NMR spectroscopy of the propylene 1-hexene copolymer (PHC-2);

c) Melt Flow Rate (MFR)

The melt flow rates $MFR_2$ are measured with a load of 2.16 kg at 230° C. for propylene copolymers. The melt flow rate is the quantity of polymer in grams which the test apparatus standardised to ISO 1133 extrudes within 10 minutes at a temperature of 230° C. under a load of 2.16 kg.

Calculation of melt flow rate $MFR_2$ (230° C.) of the second propylene copolymer fraction (R-PP2):

$$MFR(PP2) = 10^{\left[\frac{log(MFR(PP)) - w(PP1) \times log(MFR(PP1))}{w(PP2)}\right]} \quad \text{(III)}$$

wherein w(PP1) is the weight fraction [in wt %] of the first propylene copolymer fraction (R-PP1), w(PP2) is the weight fraction [in wt %] of second propylene copolymer fraction (R-PP2), MFR(PP1) is the melt flow rate $MFR_2$ (230° C.) [in g/10 min] of the first propylene copolymer fraction (R-PP1), MFR(PP) is the melt flow rate $MFR_2$ (230° C.) [in g/10 min] of the random propylene copolymer (R-PP), MFR(PP2) is the calculated melt flow rate $MFR_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein w(PP) is the weight fraction [in wt %] of the random propylene copolymer (R-PP), i.e. polymer produced in the first and second reactor (R1+R2), w(E) is the weight fraction [in wt %] of the elastomeric propylene copolymer (E), i.e. polymer produced in the third (R3)

C(PP) is the comonomer content [in mol %] of the random propylene copolymer (R-PP), i.e. comonomer content [in wt %] of the polymer produced in the first and second reactor (R1+R2), C(RAHECO) is the comonomer content [in mol %] of the propylene copolymer, i.e. is the comonomer content [in mol %] of the polymer obtained after polymerization in the fourth reactor (R3), C(E) is the calculated comonomer content [in mol %] of elastomeric propylene copolymer (E), i.e. of the polymer produced in the third (R3).

Calculation of melt flow rate $MFR_2$ (230° C.) of the propylene 1-hexene copolymer (PHC-2):

$$MFR(B) = 10^{\left[\frac{log(MFR(P)) - w(A) \times log(MFR(A))}{w(B)}\right]}$$

wherein w(A) is the weight fraction of the propylene 1-hexene copolymer (PHC-1);

w(B) is the weight fraction of propylene 1-hexene copolymer (PHC-2);

MFR(A) is the melt flow rate $MFR_2$ (230° C.) [in g/10 min] measured according ISO 1133 of the propylene 1-hexene copolymer (PHC-1);

MFR(P) is the melt flow rate MFR$_2$ (230° C.) [in g/10 min] measured according ISO 1133 of the propylene 1-hexene copolymer (PHC);

MFR(B) is the calculated melt flow rate MFR$_2$ (230° C.) [in g/10 min] of the propylene 1-hexene copolymer (PHC-2).

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1: 2003 and ISO 16014-4: 2003. A Waters Alliance GPCV 2000 instrument, equipped with refractive index detector and online viscosimeter is used with 3× TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Xylene Soluble Fraction (XCS, wt %)

The amount of the polymer soluble in xylene is determined at 25° C. according to ISO 16152.

Intrinsic Viscosity (iV)

The intrinsic viscosity (iV) value increases with the molecular weight of a polymer. The iV values e.g. of the XCS were measured according to ISO 1628/1 in decalin at 135° C.

DSC Analysis, Melting Temperature (Tm), Crystallization Temperature (Tc)

These properties were measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature (Tc) and crystallization enthalpy (Hc) are determined from the cooling step, while melting temperature (Tm) and melting enthalpy (Hm) are determined from the second heating step, respectively, from the first heating step in case of the webs.

Charpy Notched Impact Strength

Charpy notched impact is measured according to ISO 179/1eA at +23° C. and at −20° C. using an injection moulded test specimen (80×10×4 mm$^3$) as produced according to ISO 1873.

Tensile Properties

Tensile modulus in machine and transverse direction were determined according to ISO 527-3 at 23° C. on blown films with a thickness of 50 μm as produced indicated below. Testing was performed at a cross head speed of 1 mm/min.

Flexural Modulus

The flexural modulus was determined in 3-point-bending according to ISO 178 on 80×10×4 mm$^3$ test bars injection moulded at 23° C. in line with EN ISO 1873-2.

Dart-drop impact strength (DDI) is measured using ASTM D1709, method A (Alternative Testing Technique) from the film samples (50 μm blown film). A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Haze was determined according to ASTM D1003 on blown films with a thickness of 50 μm (haze$_{50\ \mu m}$) produced as indicated below or on a 1 mm thick injection moulded specimen (haze$_{1\ mm}$).

C6 FDA

It is measured based on FDA section 177.1520. 1 g of a polymer film of 100 μm thickness is added to 400 ml hexane at 50° C. for 2 hours while stirring with a reflux cooler. After 2 hours the mixture is immediately filtered on a filter paper. The precipitate is collected in an aluminium recipient and the residual hexane is evaporated on a steam bath under N2 flow. The amount of hexane solubles is determined by the formula ((wt. sample+wt. crucible)−(wt crucible))/(wt. sample)× 100%.

B. Examples

B.1. Preparation of RAHECO

The catalyst used in the polymerization processes for the heterophasic propylene copolymers (RAHECO) of the inventive and comparative examples was prepared as follows:

Used Chemicals

20% solution in toluene of butyl ethyl magnesium (Mg (Bu)(Et), BEM), provided by Chemtura 2-ethylhexanol, provided by Amphochem; 3-Butoxy-2-propanol-(DOW-ANOL™PnB), provided by Dow; bis(2-ethylhexyl)citraconate, provided by SynphaBase; TiCl4, provided by Millenium Chemicals; Toluene, provided by Aspokem; Viscoplex® 1-254, provided by Evonik; Heptane, provided by Chevron Preparation of a Mg Alkoxy Compound Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and dicyclopentyl dimethoxy silane (D-Donor) as donor Polymerization was conducted on a Borstar pilot plant with the set up of prepolymerizer loop, first gas phase reactor (GPR1) and second gas phase reactor (GPR2).

TABLE 1

Polymerization conditions

|  | units | RAHECO |
|---|---|---|
| Prepolymerizer |  |  |
| Temperature | ° C. | 20 |
| Teal/Ti | mol/mol | 265 |
| TEAL/Donor | mol/mol | 7 |
| Residence time | h | 0.38 |
| Loop (R1) |  |  |
| Temperature | ° C. | 70 |
| Pressure | bar | 55 |
| Feed H2/C3 | mol/kmol | 0.2 |
| Feed C2/C3 | mol/kmol | 4.4 |
| Split | wt % | 32 |
| Residence time | h | 0.38 |
| MFR2 | g/10 min | 0.58 |
| XCS | wt % | 6.7 |
| C2 content | wt % | 2.5 |
| First gas phase reactor (R2) |  |  |
| Temperature | ° C. | 80 |
| Pressure | bar | 21 |
| H2/C3 | mol/kmol | 3.2 |
| C2/C3 | mol/kmol | 27.5 |
| Split | wt % | 52 |
| Residence time | h | 2.25 |
| MFR2 | g/10 min | 0.74 |
| XCS | wt % | 7.4 |
| C2 content | wt % | 3.8 |
| Second gas phase reactor (R3) |  |  |
| Temperature | ° C. | 70 |
| Pressure | bar | 14 |
| H2/C3 | mol/kmol | 71 |
| C2/C3 | mol/kmol | 567 |
| Split | wt % | 16 |
| Residence time | h | 1.4 |
| MFR2 | g/10 min | 0.53 |
| XCS | wt % | 22.0 |
| C2 | wt % | 10.4 |

The polymer powder was compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

TABLE 2

Properties of RAHECO

| Pellet | unit | RAHECO |
|---|---|---|
| XCS | [wt %] | 22.0 |
| IV(XCS) | [dl/g] | 3.1 |
| C2(XCS) | [wt %] | 35.0 |
| Total C2 | [wt %] | 10.5 |
| MFR2 | [g/10 min] | 0.6 |
| Tm | [° C.] | 143 |

Propylene-1-hexene Copolymer (PHC)

The propylene-1-hexene copolymer is a random propylene-1-hexene copolymer with a $C_6$ co-monomer content of about 5 wt % and a $MFR_2$ of 1.5 g/10 min. It was produced in a two stage polymerization process pilot plant with a metallocene catalyst as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

The random propylene-1-hexene copolymer was prepared in a sequential process comprising a loop reactor and a gas phase reactor. The reaction conditions are summarized in Table 3.

TABLE 3

Preparation of propylene-1-hexene copolymer (PHC)

|  |  | PHC |
|---|---|---|
| Prepolymerization |  |  |
| Temperature | [° C.] | 20 |
| Catalyst feed | [g/h] | 2.5 |
| C3 feed | [kg/h] | 60.7 |
| H2 feed | [g/h] | 0.5 |
| Residence time | [h] | 0.4 |
| Loop (R1) |  |  |
| Temperature | [° C.] | 70 |
| Pressure | [kPa] | 5292 |
| H2/C3 ratio | [mol/kmol] | 0.08 |
| C6/C3 ratio | [mol/kmol] | 14.1 |
| $MFR_2$ | [g/10 min] | 1.8 |
| XCS | [wt %] | 1.9 |
| C6 | [wt %] | 1.7 |
| Residence time | [h] | 0.5 |
| Split | [wt %] | 42.0 |
| GPR (R2) |  |  |
| Temperature | [° C.] | 80 |
| Pressure | [kPa] | 2406 |
| H2/C3 ratio | [mol/kmol] | 0.8 |

TABLE 3-continued

Preparation of propylene-1-hexene copolymer (PHC)

|  |  | PHC |
|---|---|---|
| C6/C3 ratio | [mol/kmol] | 9.2 |
| C6 (GPR) | [wt %] | 8.2 |
| MFR$_2$ (GPR) | [g/10 min] | 1.2 |
| Residence time | [h] | 2.6 |
| Split | [wt %] | 58.0 |
| Product |  |  |
| C6 | [wt %] | 5.5 |
| XCS | [wt %] | 25.0 |
| C6 (XCS) | [wt %] | 7.2 |
| MFR$_2$ (copolymer) | [g/10 min] | 1.4 |
| Tm | [° C.] | 135 |
| MWD | — | 3.6 |

The polymer powder was compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9)

Compounding of the inventive and comparative examples was done on a ZSK 18 twin screw extruder. Mass temperature: 230° C.

In the Comparative Examples CE2 and CE3 RB801CF was used instead of PHC.

Commercial grade RB801CF-01 is available from Borealis AG, Austria and is an unnucleated propylene-ethylene random copolymer having a melting temperature Tm of 140° C., a total C2 content of 4.5 wt % and an XCS content of 8.1 wt %.

TABLE 4

Properties of the compositions measured on injection moulded specimens

|  |  | IE1 | IE2 | IE3 | IE4 | CE1 | CE2 | CE3 |
|---|---|---|---|---|---|---|---|---|
| RAHECO | wt % | 95 | 85 | 70 | 55 | 100 | 55 | 85 |
| PHC | wt % | 5 | 15 | 30 | 45 | 0 | 0 | 0 |
| RB801CF | wt % | 0 | 0 | 0 | 0 | 0 | 45 | 14 |
| MFR$_2$ | g/10 min | 1.19 | 1.27 | 1.42 | 1.52 | 1.4 | 1.83 | 1.27 |
| FM | MPa | 631 | 643 | 637 | 666 | 677 | 669 | 652 |
| NIS/23° C. | kJ/m$^2$ | 51.0 | 63.8 | 55.0 | 49.0 | 44.5 | 11.0 | 41.0 |
| NIS/−20° C. | kJ/m$^2$ | 2.0 | 2.0 | 1.9 | 1.5 | 2.0 | 1.6 | 2.0 |
| C6 FDA | wt % | 1.1 | 1.1 | 0.9 | 1.0 | 1.3 | 1.2 | 1.1 |
| Haze$_{1\,mm}$ | % | 69 | 63 | 62 | 56 | 73 | 69 | 70 |

The addition of the PHC clearly improves the impact strength by keeping the same modulus. The addition of RB801CF reduces the impact strength if the amount is high. Moreover, on 1 mm specimens the optics of IEs are better.

The compositions were further converted on a Collin lab-scale blown film line into 50 μm monolayer blown films. This line has a screw diameter of 30 millimetres (mm), L/D of 30, a die diameter of 60 mm, a die gap of 1.5 mm and a duo-lip cooling ring. The film samples were produced at 190° C. with an average thickness of 50 μm, with a 2.5 blow-up-ratio and an output rate of about 8 kilograms per hour (kg/h).

TABLE 5 film properties

|  |  | IE1 | IE2 | IE3 | IE4 | CE1 | CE2 | CE3 |
|---|---|---|---|---|---|---|---|---|
| RAHECO | wt % | 95 | 85 | 70 | 55 | 100 | 55 | 85 |
| PHC | wt % | 5 | 15 | 30 | 45 | 0 | 0 | 0 |
| RB801CF | wt % | 0 | 0 | 0 | 0 | 0 | 45 | 14 |
| TM/MD | MPa | 606 | 647 | 654 | 629 | 663 | 714 | 652 |
| TM/TD | MPa | 526 | 604 | 590 | 599 | 653 | 657 | 610 |
| DDI | g | 234 | 326 | 372 | 318 | 105 | 87 | 123 |
| Haze$_{50\,\mu m}$ | % | 19 | 15 | 12 | 10 | 31 | 15 | 20 |
| OMA |  | 7463 | 14061 | 20274 | 20002 | 2246 | 4141 | 4009 |

As can be seen, the addition of the random propylene-1-hexene copolymer to the random heterophasic propylene copolymer (1E1, 1E2) significantly improves the DDI. Furthermore, the inventive polypropylene compositions clearly show an improvement in the overall performance (OMA).

The invention claimed is:
1. A polypropylene composition comprising a blend of:
(A) 50.0 to 99.0 wt % of a random heterophasic propylene copolymer (RAHECO) comprising a matrix (M) being a random propylene copolymer (R-PP) and an elastomeric propylene copolymer (E) dispersed in said matrix (M), said random heterophasic propylene copolymer (RAHECO) having
   (i) a melting temperature in the range of from 130 to 155° C.,
   (ii) an MFR2 (230° C., 2.16 kg, ISO 1133) in a range of from 0.1 to 10.0 g/10 min,
   ii) a xylene cold soluble (XCS) fraction, measured according to ISO 16152 at 25° C. in the range of from 15.0 to 45.0 wt %, and
   (iv) an intrinsic viscosity of the xylene cold soluble (XCS) fraction, measured according to ISO 1628-1 (135° C., in decaline) in the range of from 1.2 to 4.5 dl/g, and
(B) 1.0 to 50.0 wt % of a copolymer of propylene and 1-hexene (PHC),
wherein the copolymer (PHC) of propylene and 1-hexene has a 1-hexene content in the range of from 2.0 to 12.0 wt % and a MFR2 (230° C., 2.16 kg, ISO 1133) in a range of from 0.4 to 12.0 g/10 min,
wherein the polypropylene composition has a MFR2 (230° C., 2.16 kg, ISO 1133) in the range of from 0.2 to 12.0 g/10 min.

2. The polypropylene composition according to claim 1, wherein the copolymer (PHC) of propylene and 1-hexene comprises:
   (i) a first random propylene copolymer (PHC-1) of propylene and 1-hexene, and
   (ii) a second random propylene copolymer (PHC-2) of propylene and 1-hexene.

3. The polypropylene composition according to claim 2, wherein the first propylene-1-hexene copolymer (PHC-1) has a 1-hexene content in the range of 0.1 to 3.9 wt % and the second propylene-1-hexene copolymer (PHC-2) has an 1-hexene content in the range of 4.0 to 15.0 wt %.

4. The polypropylene composition according to claim 3, wherein the first propylene-1-hexene copolymer (PHC-1) has a 1-hexene content in the range of 0.5 to 3.5 wt %, and the second propylene-1-hexene copolymer (PHC-2) has an 1-hexene content in the range of 5.0 to 13.0 wt %.

5. The polypropylene composition according claim 2, wherein the copolymer of propylene and 1-hexene (PHC) fulfils in-equation (1),

MFR(PHC-2)/MFR(PHC-1)≤1.0(1), wherein MFR (PHC-1) is the melt flow rate MFR2 (230° C., 2.16 kg) determined according to ISO 1133 in [g/10 min] of the first random propylene copolymer (PHC-1) and MFR (PHC-2) is the melt flow rate MFR2 (230° C., 2.16 kg) determined according to ISO 1133 in [g/10 min] of the propylene copolymer (PHC-2).

6. The polypropylene composition according to claim 5, wherein the copolymer of propylene and 1-hexene (PHC) fulfils in-equation (1a):

0.5≤MFR(PHC-2)/MFR(PHC-1)≤1.0 (1a), wherein MFR (PHC-1) is the melt flow rate MFR2 (230° C., 2.16 kg) determined according to ISO 1133 in [g/10 min] of the first random propylene copolymer (PHC-1) and MFR (PHC-2) is the melt flow rate MFR2 (230° C., 2.16 kg) determined according to ISO 1133 in [g/10 min] of the propylene copolymer (PHC-2).

7. The polypropylene composition according to claim 2, wherein the second random propylene copolymer (PHC-2) has a higher 1-hexene content than the first random propylene copolymer (PHC-1).

8. The polypropylene composition according claim 1, wherein the copolymer (PHC) of propylene and 1-hexene has a xylene soluble content (XCS), determined according to ISO 16152 at 25° C., in the range of from 10.0 to 35.0 wt %.

9. The polypropylene composition according to claim 8, wherein the copolymer (PHC) of propylene and 1-hexene has a xylene soluble content (XCS), determined according to ISO 16152 at 25° C., in the range of from 15.0 to 32.0 wt %.

10. The polypropylene composition according to claim 1, wherein the comonomer of the matrix (M) is ethylene or 1-butene and the comonomer of the elastomeric propylene copolymer (E) dispersed in the matrix (M) is an ethylene or a C4 to C10 alpha-olefin.

11. The polypropylene composition according to claim 10, wherein the comonomer content of the xylene cold soluble (XCS) fraction of the random heterophasic propylene copolymer (RAHECO) is in the range of from 25.0 to 50.0 wt %.

12. The polypropylene composition according to claim 10, wherein the comonomer of the matrix (M) is ethylene, and the comonomer of the elastomeric propylene copolymer (E) dispersed in the matrix (M) is ethylene.

13. The polypropylene composition according to claim 1, wherein the random heterophasic propylene copolymer (RAHECO) has a flexural modulus, determined according to ISO 178, in the range of from 300 to 800 MPa.

14. The polypropylene composition according to claim 1, wherein the composition has one or more of below properties a), b) and c):
   a) a flexural modulus, determined according to ISO 178 on injection moulded specimens, in the range of from 400 to 1000 MPa,
   b) a Charpy notched impact strength at 23° C., determined according to ISO 179 1eA, in the range of from 40 KJ/m² to 80 KJ/m²,
   c) a haze measured according to ASTM D1033 on a 1.0 mm thick plaque in the range of from 20 to below 75%.

15. The polypropylene composition according to claim 14, wherein the composition has alternatively of in addition one or more of below properties d), e) and f):
   d) a Tensile modulus, in machine and transverse direction according to ISO 527-3 at 23° C. measured on 50 µm blown films, in the range of from 350 to 900 MPa,
   e) a dart-drop impact strength (DDI) determined according to ASTM D1709, method A on a 50 µm blown film of at least 150 g up to 500 g, and
   f) a haze measured according to ASTM D1033 on a 50 µm blown film in the range of from 2.0 to below 30%.

16. The polypropylene composition according to claim 15, wherein the composition has an optomechanical ability (OMA) determined on a 50 µm blown film according to the formula given below:

$$OMA = \frac{\text{Tensile Modulus}(MD)[\text{MPa}] * DDI(g)}{\text{Haze}(50 \ \mu m) [\%]}$$

of at least 5000 [MPa*g/%] up to 30000 [MPa*g/%].

17. A process for preparing a polypropylene composition according to claim 1, comprising the following stages I), II) and III):
- I) preparing (A) the random heterophasic propylene copolymer (RAHECO) including the steps (i)+ (ii)
  - (i) preparation of the matrix (M) phase of the random heterophasic propylene copolymer (RAHECO), wherein stage step (i) comprises the following step:
    - a) polymerization of propylene with at least one comonomer selected from ethylene and a C4-C12 alpha-olefin to afford a random propylene copolymer, step a) being conducted in at least one slurry phase reactor at a reactor temperature of between 62 and 85° C. and
  - (ii) preparation of the elastomeric propylene copolymer (E) of the random heterophasic propylene copolymer (RAHECO), wherein stage step (ii) comprises the following step:
    - b) co-polymerization of propylene with at least one comonomer selected from ethylene and a C4-C12 alpha-olefin to result in an olefin-propylene copolymer, step b) being conducted in at least one gas phase reactor at a reactor temperature of between 6° and 95° C.,
- II) preparing (B) the propylene-1-hexene copolymer (PHC) by polymerization of propylene and 1-hexene in at least two reactors connected in series and
- III) blending (A) and (B), i.e. the random heterophasic propylene copolymer (RAHECO) with (B) the propylene-1-hexene random copolymer (PHC) by mechanical blending.

18. The process according to claim 17, wherein:
- I) the random heterophasic propylene copolymer (RAHECO) has been polymerized in the presence of a Ziegler-Natta catalyst (ZN-C) comprising compounds (TC) of a transition metal of Group 4 to 6 of the IUPAC Periodic Table of Elements, a Group 2 metal compound (MC) and an internal donor (ID), wherein said internal donor (ID) is a non-phthalic compound, and
- II) the propylene-1-hexene random copolymer (PHC) has been polymerized in the presence of a metallocene catalyst.

19. A method for the production of blown or cast film, wherein the method comprises producing a blown film or cast film of the polypropylene composition according to claim 1.

20. An article comprising a polypropylene composition according to claim 1.

* * * * *